(12) United States Patent
Sakagami et al.

(10) Patent No.: US 7,251,207 B2
(45) Date of Patent: Jul. 31, 2007

(54) MULTI-LEVEL DATA PROCESSING METHOD AND APPARATUS

(75) Inventors: Koubun Sakagami, Kanagawa (JP); Akihiko Shimizu, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 651 days.

(21) Appl. No.: 10/689,029

(22) Filed: Oct. 21, 2003

(65) Prior Publication Data
US 2004/0085878 A1 May 6, 2004

(30) Foreign Application Priority Data
Oct. 30, 2002 (JP) ............................ 2002-316826

(51) Int. Cl.
*G11B 7/005* (2006.01)
(52) U.S. Cl. .................... 369/59.23; 369/53.24; 369/59.11; 341/50; 341/56; 375/286
(58) Field of Classification Search ......... 369/59.23, 369/53.23, 53.24, 59.11; 341/56, 50; 375/286
See application file for complete search history.

(56) References Cited

U.S. PATENT DOCUMENTS

| | | | |
|---|---|---|---|
| 3,754,237 A | * | 8/1973 | de Laage de Meux ....... 341/56 |
| 3,831,145 A | * | 8/1974 | Mecklenburg et al. ...... 714/810 |
| 4,118,791 A | * | 10/1978 | Swain ........................ 341/50 |
| 4,408,189 A | * | 10/1983 | Betts et al. .................. 341/56 |
| 5,140,322 A | | 8/1992 | Sakagami |
| 5,142,380 A | | 8/1992 | Sakagami et al. |
| 5,220,556 A | | 6/1993 | Shimizu |
| 5,344,683 A | | 9/1994 | Shimizu |
| 5,497,194 A | | 3/1996 | Sakagami et al. |
| 5,638,354 A | | 6/1997 | Nakayama et al. |
| 5,737,307 A | | 4/1998 | Shimizu |
| 5,812,520 A | | 9/1998 | Nakayama et al. |
| 5,822,286 A | | 10/1998 | Nakayama et al. |
| 5,926,446 A | | 7/1999 | Shimizu |

(Continued)

FOREIGN PATENT DOCUMENTS

JP 2002-11160 1/2002

OTHER PUBLICATIONS

Sung-Mood Yang et al, "LSB-Coded Modulation and its Applications to Microwave Digital Radios," Proc. Of Global Telecommunications Conf., Nov. 18, 1996, pp. 1243-1247, London UK.*

(Continued)

*Primary Examiner*—Wayne Young
*Assistant Examiner*—Thomas Alunkal
(74) *Attorney, Agent, or Firm*—Dickstein Shapiro LLP

(57) ABSTRACT

A multi-level data processing method converts a binary data into a multi-level data having n bits per symbol, where n is an integer satisfying $n \geq 2$. A $\{(n-1) \times m\}$-bit binary data is arranged in upper (n-1) bits of multi-level data of m symbols, where m is an integer satisfying $m \geq 2$, and a (m-k)-bit binary data is converted into m bits according to a predetermined conversion rule and arranged in a lower 1 bit of the multi-level data of m symbols, where k is an integer satisfying $m > k \geq 1$, so as to convert a (n×m-k)-bit binary data into 1 set of multi-level data made up of m symbols.

13 Claims, 13 Drawing Sheets

U.S. PATENT DOCUMENTS

| | | | |
|---|---|---|---|
| 6,127,100 A | 10/2000 | Shimizu | |
| 6,487,149 B1 | 11/2002 | Yokoi et al. | |
| 6,504,875 B2 * | 1/2003 | Perino et al. | 375/257 |
| 6,888,479 B2 * | 5/2005 | Sakagami et al. | 341/56 |
| 2002/0021643 A1 | 2/2002 | Miura et al. | |
| 2002/0036978 A1 | 3/2002 | Shimizu | |
| 2002/0071380 A1 | 6/2002 | Shimizu et al. | |
| 2003/0030719 A1 | 2/2003 | Shimizu | |
| 2003/0110444 A1 | 6/2003 | Sakagami et al. | |
| 2003/0112667 A1 | 6/2003 | Shimizu et al. | |
| 2003/0169666 A1 | 9/2003 | Sakagami | |
| 2004/0009371 A1 | 1/2004 | Sakagami et al. | |
| 2004/0027958 A1 | 2/2004 | Takeuchi et al. | |

OTHER PUBLICATIONS

Sakagami, K. et al., "A New Data Modulation Method for Multi-Level Optical Recording," Proc. Of International Symp. On Optical Memory of Optical Data Storage Meeting, Jul. 7, 2002, pp. 54-56, Waikoloa, USA.*

Wong, T.L. et al., "Multilevel Optical Recording," J. Magn. Soc. Jpn., vol. 25, No. 3, pt 2, 2001, pp. 433-436, Japan.*

Penicaud, M. et al., "Interactive Decoding of Rate Adaptive Multilevel Code Modulation for Mobile Satellite Communication," Proc. Of Global Telecommunications Conf., Nov. 18, 1996, pp. 415-519, UK.*

* cited by examiner

FIG.4

| D1 | D2 | (1) L1 | L2 | L3 | L4 | (2) L1 | L2 | L3 | L4 | (3) L1 | L2 | L3 | L4 | (4) L1 | L2 | L3 | L4 |
|---|---|---|---|---|---|---|---|---|---|---|---|---|---|---|---|---|---|
| 0 | 0 | 0 | 0 | 0 | 0 | 0 | 0 | 0 | 1 | 1 | 0 | 0 | 0 | 0 | 0 | 1 | 1 |
| 0 | 1 | 0 | 0 | 1 | 0 | 1 | 1 | 0 | 1 | 1 | 0 | 0 | 1 | 1 | 1 | 0 | 1 |
| 1 | 0 | 1 | 1 | 0 | 1 | 0 | 0 | 1 | 0 | 0 | 1 | 1 | 0 | 1 | 0 | 1 | 0 |
| 1 | 1 | 1 | 1 | 1 | 1 | 1 | 1 | 1 | 0 | 0 | 1 | 1 | 1 | 0 | 1 | 0 | 0 |

| SYMBOL VALUE OF MULTI-LEVEL DATA | | | SIGNAL VALUE OF CENTER MULTI-LEVEL DATA |
|---|---|---|---|
| BEFORE | CENTER | AFTER | |
| 0 | 0 | 0 | T(0,0,0) |
| 0 | 0 | 1 | T(0,0,1) |
| 0 | 0 | 2 | T(0,0,2) |
| ⋮ | ⋮ | ⋮ | ⋮ |
| p | q | r | T(p,q,r) |
| ⋮ | ⋮ | ⋮ | ⋮ |
| 7 | 7 | 6 | T(7,7,6) |
| 7 | 7 | 7 | T(7,7,7) |

FIG.7A

| | S1 | S2 | S3 | S4 |
|---|---|---|---|---|
| q1 | 2 | 5 | 6 | 1 |
| q2 | 3 | 4 | 7 | 2 |

FIG.7B

| CONVERSION TABLE (1) | | | | JUDGING CANDIDATES WITHIN SET | | | |
|---|---|---|---|---|---|---|---|
| L1 | L2 | L3 | L4 | S1 | S2 | S3 | S4 |
| 0 | 0 | 0 | 0 | 2 | 4 | 6 | 2 |
| 0 | 1 | 1 | 0 | 2 | 5 | 7 | 2 |
| 1 | 0 | 0 | 1 | 3 | 4 | 6 | 1 |
| 1 | 1 | 1 | 1 | 3 | 5 | 7 | 1 |

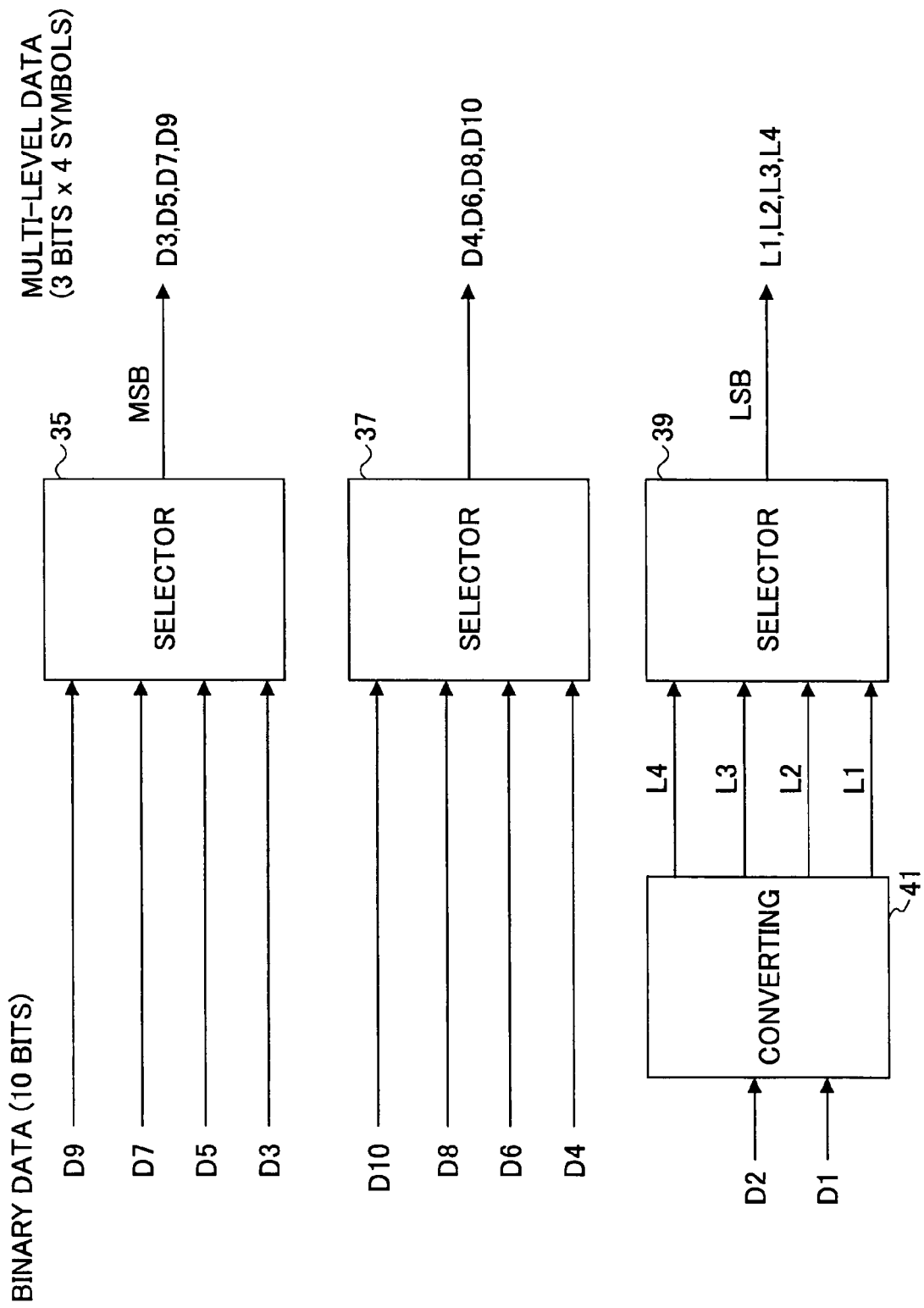

MULTI-LEVEL DATA PROCESSING METHOD AND APPARATUS

This application claims the benefit of a Japanese Patent Application No. 2002-316826 filed Oct. 30, 2002, in the Japanese Patent Office, the disclosure of which is hereby incorporated by reference.

BACKGROUND OF THE INVENTION

1. Field of the Invention

The present invention generally relates to, and more particularly to multi-level (or multi-valued) data processing methods and apparatuses, and more particularly to a multi-level data processing method and a multi-level data processing method which are used when recording and/or reproducing the multi-level data on and/or from an information recording medium such as an optical disk.

2. Description of the Related Art

Conventionally, there was a multi-level data processing method which records on an information recording medium a test data made up of all combinations of a plurality of (3) consecutive multi-level data, creates a table that stores reproduced signal values of the test data at the time of reproducing the multi-level data, and outputs as the reproduced multi-level data the multi-level data which are reproduced and have a smallest error with respect to the reproduced signal values stored in the table.

In addition, when using the table to judge the reproduced multi-level data, there was a multi-level data processing method which judges the first and third multi-level data of the 3 consecutive multi-level data by comparison with a fixed threshold value, and thereafter outputs as the reproduced multi-level data the multi-level data which are reproduced and minimize the error between the second multi-level data and the reproduced signal value stored in the table. In this case, the accuracy of judging the reproduced multi-level data is improved, and the table can be made compact.

Moreover, there was a multi-level data processing method which treats the plurality of multi-level data as one set of multi-level data. The binary data is arranged as it is in the upper bits of each multi-level data, and a data according to a predetermined conversion rule is arranged in a lower one bit so as to convert the binary (bi-level) data into the multi-level data. Since an error is easily generated in the lower one bit when reproducing the multi-level data, the multi-level data is judged by utilizing the fact that the data is in accordance with the predetermined conversion rule. When recording (or transmitting) the multi-level data amounting to n (n≧2) bits/symbol, this multi-level data processing method regards m (m≧2) symbols as 1 set, and arranges an arbitrary binary data in upper {(n−1 bits)×(m symbols)}={(n−1)×m} bits of each symbol, and arranges a binary data which is obtained by converting (m−1) bits into m bits according to the predetermined conversion rule in lower {(1 bit)×(m symbols)}=m bits of each symbol. Although a 1-bit redundant data is generated by the predetermined conversion rule, it is possible to improve the accuracy of judging the multi-level data.

Furthermore, according to this multi-level data processing method, the data obtained by the conversion according to the predetermined conversion rule is arranged in the lower 1 bit. Hence, the method is effective only when a data error at the time of reproducing the multi-level data, if any, occurs in the lower 1 bit, and an erroneous judgement of the multi-level data occurs if the data error exceeds the lower 1 bit. For this reason, a multi-level data processing method has been proposed which extends the redundant data to lower k bits.

When recording (or transmitting) the multi-level data amounting to n (n≧2) bits/symbol, this proposed multi-level data processing method regards m (m≧2) symbols as 1 set, and arranges an arbitrary binary data in upper {(n−k bits)×(m symbols)}={(n−k)×m} bits of each symbol (k≧1 and n>k), and arranges a binary data which is obtained by converting (m×k−1) bits into (m×k) bits according to the predetermined conversion rule in lower {(k bits)×(m symbols)}=(m×k) bits of each symbol, so as to extend the redundant data to lower k bits. Consequently, it is possible to improve the accuracy of judging the multi-level data, even when a data transmission path has properties which generates a large number of errors. In this case, the data transmission path refers to an information recording medium such as an optical disk, a communication path and the like.

Accordingly, the conventional and proposed multi-level data processing methods employ a kind of pattern recognition technique by regarding an intersymbol interference which is generated at the time of successively recording the multi-level data as a correlation between the data. As a result, when the number of multi-levels of the multi-level data is large or the noise in the reproduced signal is large, for example, there was a problem in that the distinction of the patterns in the table becomes fuzzy to thereby cause an erroneous judgement of the multi-level data.

On the other hand, at the time of reproducing the multi-level data, a waveform equalization is carried out with respect to the reproduced signal and the intersymbol interference is eliminated, before outputting candidates of the multi-level data by judging the multi-level data using the fixed threshold value. Thereafter, the candidate having the data in accordance with the predetermined conversion rule in the lower bits of the multi-level data is selected, and the candidate having a smallest error with respect to the reproduced signal value stored in the table is output as the reproduced multi-level data. Therefore, the intersymbol interference actually remains slightly even after the waveform equalization, and there were problems in that an error may occur when outputting the candidate of the multi-level data using the fixed threshold value to judge the multi-level data, and that the final reproduced multi-level data which is output may be in error.

Accordingly, a multi-level data processing method which carries out a first multi-level data judging process and a second multi-level data judging process in parallel, and outputs a judgement result of one of the first and second multi-level data judging processes that is more appropriate, has been proposed in a Japanese Laid-Open Patent Application No. 2002-011160. FIG. 1 is a flow chart for explaining this proposed multi-level data processing method which carries out the first and second multi-level data judging processes in parallel.

In FIG. 1, a step S101 carries out the first multi-level data judging process with respect to an output signal value of a waveform equalizer circuit (not shown) which equalizes a signal reproduced from an information recording medium (not shown). More particularly, when recording the multi-level data on the information recording medium, a test data which is made up of all combinations of a plurality of (3) consecutive multi-level data is recorded on the information recording medium in addition to the multi-level data which forms the user data. When judging the multi-level data, a table which stores reproduced signal values of the test data is created. Then, the multi-level data which minimizes an error between the reproduced signal value of the multi-level data forming the user data and the reproduced signal value stored in the table is output as a judgement result of the first multi-level data judging process.

The first multi-level data judging process employs the kind of pattern recognition technique which regards the intersymbol interference generated at the time of consecutively recording the multi-level data as the correlation of the data, to judge the multi-level data. But when the number of multi-levels of the multi-level data is large or the noise in the reproduced signal is large, for example, the distinction of the patterns in the table becomes fuzzy to thereby cause an erroneous judgement of the multi-level data.

A step S103 carries out the second multi-level data judging process with respect to the output signal value of the waveform equalizer circuit. More particularly, the multi-level data forming the user data are converted from binary data into multi-level data at the time of recording onto the information recording medium. A plurality of multi-level data are treated as 1 set, and the binary data is arranged as it is in the upper bit side of each multi-level data, while the binary data is converted according to the predetermined conversion rule and arranged in the lower bit side of each multi-level data. Since the error more easily occurs in the lower bit when judging the multi-level data, the multi-level data is judged by using the fact that the data arranged in the lower bit side has been converted according to the predetermined conversion rule.

A step S105 generates judging candidates of the multi-level data of each symbol within 1 set according to the predetermined conversion rule, and outputs as a judgement result the candidate which minimizes an error between a reference value of the judging candidates and the reproduced signal value. Although a 1-bit redundant data is generated by the conversion according to the predetermined conversion rule, the accuracy of judging the multi-level data is improved.

Next, when reproducing the multi-level data, a waveform equalization is carried out with respect to the reproduced signal and the intersymbol interference is eliminated, before generating the judging candidates of the multi-level data by judging the multi-level data using the fixed threshold value. Thereafter, the judging candidate having the data in accordance with the predetermined conversion rule in the lower bits of the multi-level data is selected, and the judging candidate having a smallest error is output as the reproduced multi-level data. Therefore, the intersymbol interference actually remains slightly even after the waveform equalization, and an error may occur when generating the judging candidates of the multi-level data using the fixed threshold value to judge the multi-level data. Consequently, the final judgement result, that is, the final reproduced multi-level data which is output, may be in error. When carrying out the conversion according to the predetermined conversion rule, the data within the previous set also affects the result of the conversion, and the error may propagate for a plurality of sets.

The multi-level data forming the user data is in accordance with the predetermined conversion rule. Hence, a step S107 outputs the judgement result of the first multi-level data judging process as the reproduced multi-level data if this judgement result is in accordance with the predetermined conversion rule, because this judgement result of the first multi-level data judging process is more appropriate in this first case. On the other hand, the step S107 outputs the judgement result of the second multi-level data judging process as the reproduced multi-level data if the judgement result of the first multi-level data judging process is not in accordance with the predetermined conversion rule, because the judgement result of the second multi-level data judging process is more appropriate in this latter case.

Accordingly, it is possible to prevent an error that would be generated if the judgement result of the first multi-level data judging process is not in accordance with the predetermined conversion rule. In addition, if the judgement result of the first multi-level data judging process is in accordance with the predetermined conversion rule, it is possible to prevent an error that occurs when generating the judging candidates of the multi-level data according to the second multi-level data judging process using the fixed threshold value, and to prevent propagation of such an error.

However, the multi-level data processing method proposed in the Japanese Laid-Open Patent Application No. 2002-11160 may still output an erroneous multi-level data if the judgement result of the first multi-level data judging process is not in accordance with the predetermined conversion rule and the judgement result of the second multi-level data judging process is output as the reproduced multi-level data. In other words, if an error occurs when generating the judging candidates of the multi-level data by the second multi-level data judging process using the fixed threshold value, an error occurs in the final multi-level data that is obtained by the second multi-level data judging process as the reproduced multi-level data.

SUMMARY OF THE INVENTION

Accordingly, it is a general object of the present invention to provide a novel and useful multi-level data processing method and apparatus, in which the problems described above are eliminated.

Another and more specific object of the present invention is to provide a multi-level data processing method and a multi-level data processing apparatus which can reproduce multi-level data more correctly than the prior art.

Still another and more specific object of the present invention is to provide a multi-level data processing method for converting a binary data into a multi-level data having n bits per symbol, where n is an integer satisfying $n \geq 2$, comprising arranging a $\{(n-1) \times m\}$-bit binary data in upper $(n-1)$ bits of multi-level data of m symbols, where m is an integer satisfying $m \geq 2$; and converting a $(m-k)$-bit binary data into m bits according to a predetermined conversion rule and arranging the m bits in a lower 1 bit of the multi-level data of m symbols, where k is an integer satisfying $m > k \geq 1$, so as to convert a $(n \times m - k)$-bit binary data into 1 set of multi-level data made up of m symbols. According to the multi-level data processing method of the present invention, the number of judging candidates when judging the multi-level data becomes $1/2^k$, to thereby enable reduction of an erroneous judgement.

In the multi-level data processing method, k may be set to k=2. By setting k to k=2, the number of judging candidates when judging the multi-level data becomes 1/4, which is considerably reduced compared to the previously proposed method of the Japanese Laid-Open Patent Application No. 2002-011160.

The multi-level data processing method may further comprise relating data within other sets to the m bits when converting the $(m-k)$-bit binary data into the m bits. In this case, the multi-level data may be judged by taking into consideration a plurality of sets, to thereby further reduce an erroneous judgement.

The multi-level data processing method may further comprise mixing to the multi-level data made up of the m symbols a test data which includes $2^{(M \times n)}$ combinations of M consecutive multi-level data, where M is an integer satisfying $M \geq 3$. The erroneous judgement is further reduced when judging the multi-level data in this case, because it is possible to make the judgement based on a combination of a first multi-level data judging method (process) and a second multi-level data judging method (process). Further, in this case, the multi-level data processing method may reproduce multi-level data from a reproduced signal which is reproduced from an information recording medium which is recorded with a mixture of the multi-level data amounting to the m bits and the test data, and comprise inputting the reproduced signal of the test data and storing signal values of the multi-level data; inputting the reproduced signal of the multi-level data which has been converted from the binary data; calculating errors between the signal values of the multi-level data and the stored signal values; outputting a multi-level data having a smallest error as a judging candidate of each symbol within one set as a first candidate, and outputting a multi-level data having a second smallest error as a second candidate; generating a candidate of a multi-level data series of m symbols within one set according to the predetermined conversion rule, using the first and second candidates for each symbol; calculating errors between the signal value of each symbol and stored signal values corresponding to the candidate multi-level data; and outputting as a reproduced multi-level data a multi-level data series having a smallest total of the errors amounting to m symbols of one candidate. Hence, in this latter case, it is possible to reduce an error when generating judging candidates of the multi-level data compared to the conventional method which uses a fixed threshold value to generate the judging candidates.

A further object of the present invention is to provide a multi-level data processing apparatus for converting a binary data into a multi-level data having bits per symbol, where n is an integer satisfying $n \geq 2$, comprising means for arranging a $\{(n-1) \times m\}$-bit binary data in upper $(n-1)$ bits of multi-level data of m symbols, where m is an integer satisfying $m \geq 2$; and means for converting a $(m-k)$-bit binary data into m bits according to a predetermined conversion rule and arranging the m bits in a lower 1 bit of the multi-level data of m symbols, where k is an integer satisfying $m > k \geq 1$, so as to convert a $(n \times m-k)$-bit binary data into 1 set of multi-level data made up of m symbols. According to the multi-level data processing apparatus of the present invention, the number of judging candidates when judging the multi-level data becomes $1/2^k$, to thereby enable reduction of an erroneous judgement.

Another object of the present invention is to provide a multi-level data processing apparatus for converting a binary data into a multi-level data having n bits per symbol, where n is an integer satisfying $n \geq 2$, comprising a section to arrange a $\{(n-1) \times m\}$-bit binary data in upper $(n-1)$ bits of multi-level data of m symbols, where m is an integer satisfying $m \geq 2$; and a section to convert a $(m-k)$-bit binary data into m bits according to a predetermined conversion rule and arranging the m bits in a lower 1 bit of the multi-level data of m symbols, where k is an integer satisfying $m > k \geq 1$, so as to convert a $(n \times m-k)$-bit binary data into 1 set of multi-level data made up of m symbols. According to the multi-level data processing apparatus of the present inventions the number of judging candidates when judging the multi-level data becomes $1/2^k$, to thereby enable reduction of an erroneous judgement.

Still another object of the present invention is to provide a multi-level data processing apparatus for converting a binary data into a multi-level data having n bits per symbol to be recorded on an information recording medium, where n is an integer satisfying $n \geq 2$, comprising a section to arrange a $\{(n-1) \times m\}$-bit binary data in upper $(n-1)$ bits of multi-level data of m symbols, where m is an integer satisfying $m \geq 2$; a section to convert a $(m-k)$-bit binary data into m bits according to a predetermined conversion rule and arranging the m bits in a lower 1 bit of the multi-level data of m symbols, where k is an integer satisfying $m > k \geq 1$, so as to convert a $(n \times m-k)$-bit binary data into 1 set of multi-level data made up of m symbols; and a section to mix to the multi-level data made up of the m symbols a test data which includes $2^{(M \times n)}$ combinations of M consecutive multi-level data, where M is an integer satisfying $M \geq 3$, to be recorded on the information recording medium. According to the multi-level data processing apparatus of the present invention, the number of judging candidates when judging the multi-level data becomes $1/2^k$, to thereby enable reduction of an erroneous judgement. In addition, the erroneous judgement is particularly reduced when judging the multi-level data in this case, because it is possible to make the judgement based on a combination of a first multi-level data judging method (process) and a second multi-level data judging method (process). Further, in this case, the multi-level data processing apparatus may reproduce multi-level data from a reproduced signal which is reproduced from the information recording medium which is recorded with the mixture of the multi-level data amounting to the m bits and the test data, and comprise a section to input the reproduced signal of the test data and store signal values of the multi-level data; a section to input the reproduced signal of the multi-level data which has been converted from the binary data; a section to calculate errors between the signal values of the multi-level data and the stored signal values; a section to output a multi-level data having a smallest error as a judging candidate of each symbol within one set as a first candidate, and to output a multi-level data having a second smallest error as a second candidate; a section to generate a candidate of a multi-level data series of m symbols within one set according to the predetermined conversion rule, using the first and second candidates for each symbol; a section to calculate errors between the signal value of each symbol and stored signal values corresponding to the candidate multi-level data; and a section to output as a reproduced multi-level data a multi-level data series having a smallest total of the errors amounting to m symbols of one candidate. Hence, in this latter case, it is possible to reduce an error when generating judging candidates of the multi-level data compared to the conventional method which uses a fixed threshold value to generate the judging candidates.

Therefore, the present invention can achieve the following two improvements (I1) and (I2), to realize the objects of the present invention described above.

(I1) The number of bits of redundant data added by the predetermined conversion rule that is used when converting the binary data into the multi-level data is set to k bits, where k is an integer satisfying the relationship $m > k \geq 1$.

(I2) When generating the judging candidate of the multi-level data according to the second multi-level data judging method (process), the judgement result of the first multi-level data judging method (process) is used, instead of using a fixed threshold value.

The improvement (I1) has the effect of reducing the number of judging candidates by increasing the redundant data, and reduces the erroneous judgement. On the other hand, the improvement (I2) is based on experimental results experiments conducted by the present inventors, namely, that the judgement result of the first multi-level data judging method (process) is the first candidate which makes the error the smallest with respect to the signal value stored in the table but the second candidate which makes the error the second smallest is correct in many cases.

Other objects and further features of the present invention will be apparent from the following detailed description when read in conjunction with the accompanying drawings.

BRIEF DESCRIPTION OF THE DRAWINGS

FIG. 4 is a diagram showing contents of a conversion table shown in FIG. 3;

FIG. 6 is a diagram showing a table storing signal values of a center multi-level data of all combinations of multi-level data of 3 consecutive symbols of test data;

FIGS. 7A and 7B are diagrams respectively showing first and second candidates of each symbol within 1 set, and judging candidates amounting to 4 symbols within 1 set that are generated using the first and second candidates of each symbol based on the conversion table shown in FIG. 4;

FIG. 8 is a system block diagram showing a structure of the multi-level data conversion circuit for converting the binary data into the multi-level data;

DESCRIPTION OF THE PREFERRED EMBODIMENTS

Figure 2:
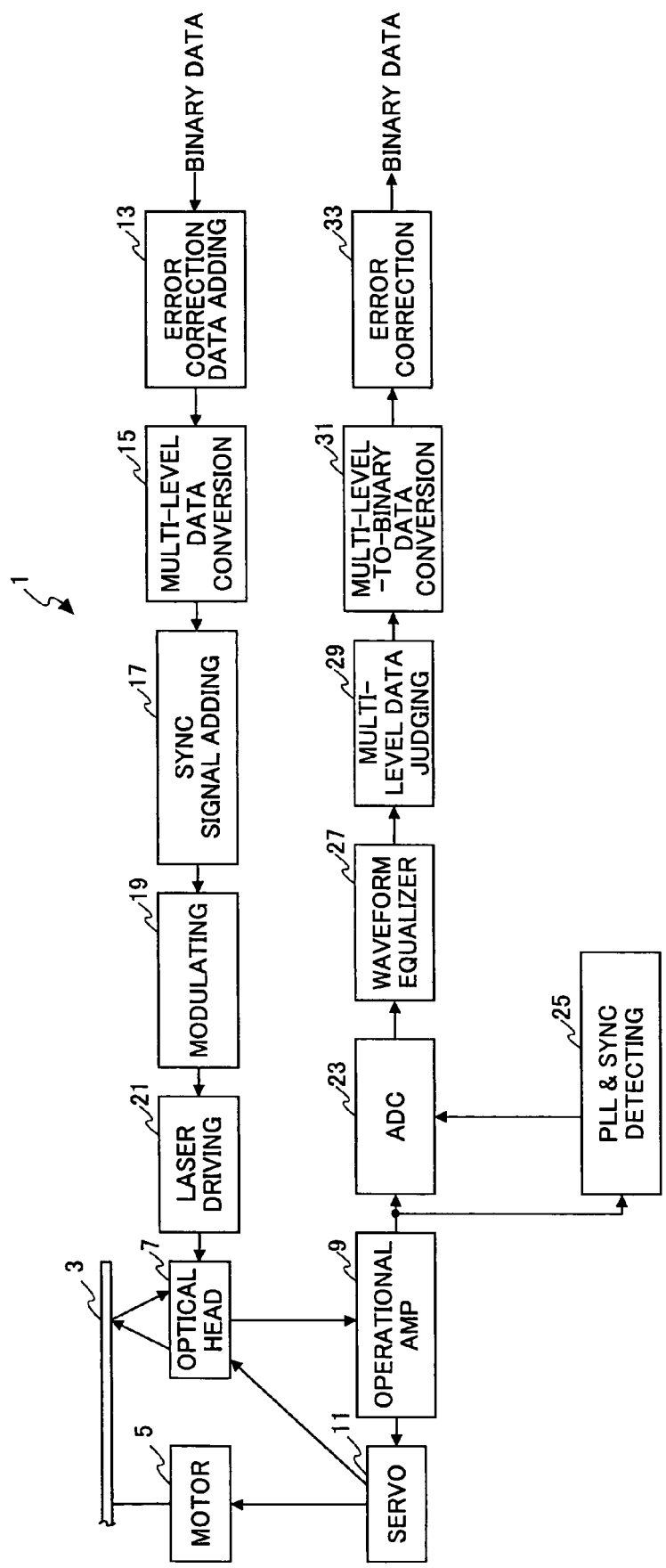
FIG. 2 is a system block diagram showing an optical disk drive including an embodiment of a multi-level data processing apparatus according to the present invention.

FIG. 2 is a system block diagram showing an optical disk drive including an embodiment of a multi-level data processing apparatus according to the present invention. This embodiment of the multi-level data processing apparatus employs an embodiment of a multi-level data processing method according to the present invention.

As shown in FIG. 2, an optical disk drive 1 includes a motor 5 for rotating an information recording medium. In this embodiment, an optical disk 3 is used as the information recording medium, and marks are recorded along a spiral track or concentric tracks on the optical disk 3. An optical head 7 scans the marks recorded on the optical disk 3 by a beam spot of a laser beam which is irradiated on the optical disk 3, and outputs an electrical signal. An operational amplifier circuit 9 subjects the electrical signal output from the optical head 7 to an operational amplification, so as to output various signals including a reproduced signal corresponding to the marks recorded on the optical disk 3, a focus error signal indicating whether or not the beam spot is correctly focused on a recording surface of the optical disk 3, a tracking error signal indicating whether or not the beam spot is correctly scanning along the track on the optical disk 3, and a signal corresponding to wobbling or swaying of the track on the optical disk 3. A servo circuit 11 for controlling the optical head 7 and the motor 5 based on the focus error signal, the tracking error signal and the signal corresponding to the wobbling or swaying of the track, so that the beam spot is correctly focused on the recording surface of the optical disk 3 and correctly scans the track and the optical disk 3 rotates at a constant linear velocity or a constant angular velocity.

A recording system of the optical disk drive 1 includes an error correction data adding circuit 13, a multi-level data conversion circuit 15, a synchronizing signal adding circuit 17, a modulating circuit 19, and a laser driving circuit 21. The error correction data adding circuit 13 adds data for carrying out an error correction with respect to an input binary data. The multi-level data conversion circuit 15 converts the input binary data obtained via the error correction data adding circuit 13 into a multi-level data. The synchronizing signal adding circuit 17 adds to the multi-level data a synchronizing signal for indicating a boundary of a predetermined amount of data. The modulating circuit 19 carries out a modulation with respect to an output of the synchronizing signal adding circuit 17, so as to output a signal indicating marks and spaces which have sizes corresponding to the multi-level data. No mark is recorded when the multi-level data is 0. The laser driving circuit 21 outputs to the optical head 7 a signal for driving a light source of the optical head 7 and recording the marks on the optical disk 3 by the laser beam, according to the output signal of the modulating circuit 19.

A reproducing system of the optical disk drive 1 includes an analog-to-digital converter (ADC) circuit 23, a phase locked loop (PLL) and synchronization detecting circuit 25, a waveform equalizer circuit 27, a multi-level data judging circuit 29, a multi-level-to-binary conversion circuit 31, and an error correction circuit 33. The ADC circuit 23 converts the reproduced signal which is output from the operational amplifier circuit 9 into a digital signal. The PLL and synchronization detecting circuit 25 detects the synchronizing signal within the reproduced signal and outputs a clock signal which is synchronized with the multi-level data. The clock signal is supplied to the ADC circuit 23. The waveform equalizer circuit 27 carries out a waveform equalization with respect to the digital signal output from the ADC circuit 23. The multi-level data judging circuit 29 judges the multi-level data based on an output of the waveform equalizer circuit 27. The multi-level-to-binary conversion circuit 31 converts the multi-level data output from the multi-level data judging circuit 29 into a binary data. The error correction circuit 33 carries out an error detection and correction using the error correction data with respect to the binary data output from the multi-level-to-binary conversion circuit 31, and outputs a binary data whose error is corrected.

Although not shown in FIG. 2, the optical disk drive 1 further includes a known mechanism for moving the optical head 7 in a radial direction of the optical disk 3 so as to search the data recorded on the optical disk 3. Furthermore, although not shown in FIG. 2, the optical disk drive 1 also includes a known interface circuit for using the optical disk drive 1 as an information storage unit of a computer, and a known microprocessor (or CPU) for controlling the operation of the entire optical disk drive 1.

Next, a description will be given of the operation of the optical disk drive 1. More particularly, a description will first be given of the operation when converting the input binary data into the multi-level data and recording the multi-level data on the optical disk 3.

The error correction data adding circuit 13 divides the input binary data into blocks each having a predetermined amount of data, and adds the error correction data. The multi-level data conversion circuit 15 then converts the binary data into the multi-level data, and the synchronizing signal adding circuit 17 thereafter adds the synchronizing signal to the multi-level data. In order to record on the optical disk 3 the marks corresponding to the values of the multi-level data which is added with the synchronizing signal, the modulating circuit 19 generates the signal indicating the marks and spaces which have sizes corresponding to the multi-level data to be recorded on the optical disk 3. The laser driving circuit 21 outputs to the optical head 7 the signal for driving the light source of the optical head 7 and recording the marks on the optical disk 3 by the laser beam emitted from the light source. As a result, the marks are recorded on the optical disk 3 by the laser beam output from the optical head 7.

Next, a description will be given of the operation of the optical disk drive 1 when reading the data from the optical disk 3, judging the multi-level data and outputting binary data which is converted from the multi-level data.

When the laser beam, having a constant intensity, is irradiated on the optical disk 3 by the optical head 7, a reflected beam from the optical disk 3 is subjected to a photoelectric conversion in the optical head 7 so as to obtain the electrical signal. This electrical signal is input to the operational amplifier circuit 9 which generates the reproduced signal, the focus error signal, the tracking error signal and the signal corresponding to the wobbling or swaying of the track on the optical disk 3. Based on the focus error signal, the tracking error signal and the signal corresponding to the wobbling or swaying of the track, the servo circuit 11 controls the optical head 7 and the motor 5, so that the optical disk 3 rotates stably, and the tracking and focusing of the optical head 7 are controlled to stably reproduce the multi-level data signal from the optical disk 3. The PLL and synchronizing signal detecting circuit 25 detects the synchronizing signal from the reproduced signal (multi-level data signal), and generates the clock signal which is synchronized with the multi-level data signal. The ADC circuit 23 converts the reproduced multi-level data into the digital data based on the clock signal. The digital data is subjected to the waveform equalization in the waveform equalizer circuit 27 and to the multi-level judging in the multi-level data judging circuit 29, and the multi-level data output from the multi-level data judging circuit 29 is converted into the binary data by the multi-level-to-binary data conversion circuit 31. The binary data output from the multi-level-to-binary data conversion circuit 31 is subjected to the error detection and correction in the error correction circuit 33, and the binary data after the error correction is output from the error correction circuit 33.

The present invention is particularly characterized by the multi-level data conversion circuit 15 and the multi-level data judging circuit 29 (multi-level data processing apparatus) shown in FIG. 2. Accordingly, a description will now be given of the method of forming the input binary data into the multi-level data in the multi-level data conversion circuit 15 and the method of judging the multi-level data in the multi-level data judging circuit 29.

First, a description will be given of the method of converting the input binary data into the multi-level data in the multi-level data conversion circuit 15, for a case where an arbitrary binary data is converted into the multi-level data. In the following description, 1 multi-level data will be referred to as a symbol, and a value the symbol may take is referred to as a symbol value. For example, in the case a symbol consists of 3 bits, the symbol value takes an octal value from 0 to 7. A multi-level data signal refers to the analog signal which is recorded on and reproduced from the optical disk 3. A digital data obtained by subjecting the multi-level data signal to an analog-to-digital conversion is referred to as a signal value.

According to the method of converting the binary data into the multi-level data in which 1 symbol is made up of n ($n \geq 2$) bits, a $\{(n-1) \times m\}$-bit arbitrary binary data ($m \geq 2$) is arranged in upper (n−1) bits of the multi-level data of m symbols, and a (m−k)-bit binary data ($m > k \geq 1$) is converted into m bits according to a predetermined conversion rule and arranged in the lower 1 bit of the multi-level data of m symbols, so as to convert a (n×m−k)-bit binary data into 1 set of multi-level data of m symbols, where n, m and k are integers.

Figure 3:
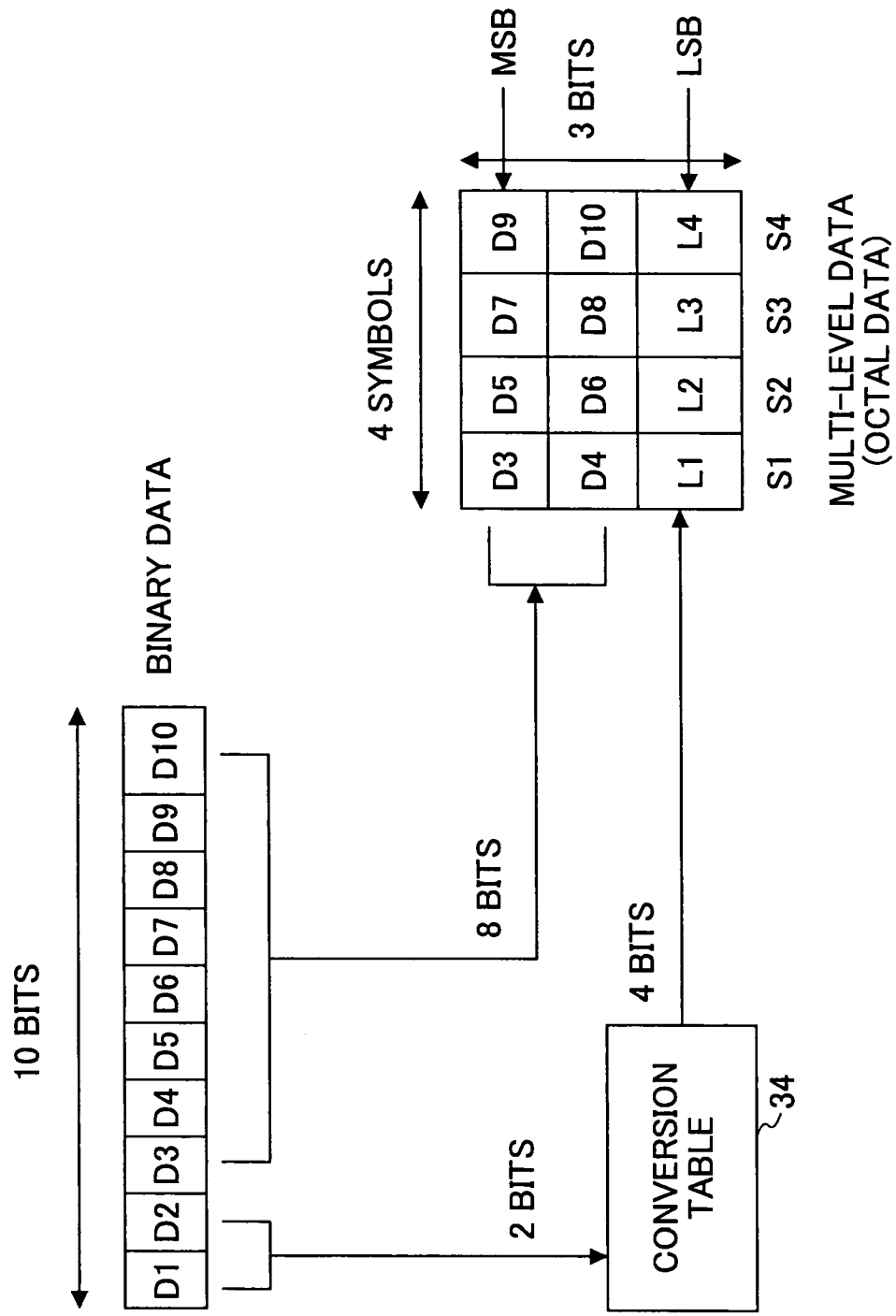
FIG. 3 is a diagram for explaining a method of converting a binary data into a multi-level data in a multi-level data conversion circuit.

Next, a description will be given of the method of converting the binary data into the multi-level data, by referring to FIG. 3. FIG. 3 is a diagram for explaining the method of converting the binary data into the multi-level data in the multi-level data conversion circuit 15.

For the sake of convenience, FIG. 3 shows a case where a 10-bit binary data is to be converted into a 4-symbol octal data. The multi-level data amounting to 1 symbol includes 3 bits, and 4 symbols are regarded as 1 set, so as to treat the multi-level data in units of 4 symbols (S1 to S4). In FIG. 3, MSB indicates the most significant bit, and LSB indicates the least significant bit.

First, 2 bits D1 and D2 of a 10-bit binary data (D1 to D10) are converted into 4 bits (L1 to L4) by conversion table 34, and arranged in the LSB of the multi-level data. Remaining 8 bits (D3 to D10) of the 10-bit binary data are arranged in the MSB side of the multi-level data as shown in FIG. 3. The conversion table 34 may be provided within the multi-level data conversion circuit 15, for example.

FIG. 4 is a diagram showing contents of the conversion table 34 shown in FIG. 3. FIG. 4 shows 4 kinds (1) through (4) of the conversion table 34 which converts a 2-bit binary data (D1, D2) into a 4-bit data (L1 to L4). When recording the multi-level data on the information recording medium such as the optical disk 3, it is known from results of experiments that an error at the time of the reproduction is approximately within ±1. For example, in the case of the octal data which can take values from 0 to 7, the value 5 may be erroneously reproduced as the value 4 or 6, but it is very rare for the value 5 to be erroneously reproduced as the value 3 or 7. Accordingly, when the multi-level data is erroneously reproduced, the tendency is for the LSB to become inverted such that 1 erroneously becomes 0 or vice versa. In the case of a normal random data, the LSB (L1 to L4) of each symbol within 1 set changes at random, and 16 kinds of bit patterns are possible. But by restricting the possible patterns of the LSB (L1 to L4) to 4 kinds for each of the 4 kinds (1) through (4) of the conversion table 34 shown in FIG. 4, it becomes possible to reduce the number of candidates to 1/4 at the time of judging the multi-level data and accordingly improve the accuracy of judging the multi-level data.

The method of converting the 2-bit data into the 4-bit data may not be limited to 1 kind, and 2 kinds of methods may be switched and selectively used for every set. For example, the following numerical value series P made up of "0"s and "1"s, which change in units of sets, for selecting the kinds (1) and (2) of the conversion table 34 shown in FIG. 4, may be defined, such that the conversion table 34 is switched to the kind (1) which is selected when P=0 and the kind (2) which is selected when P=1, for each set.

P=0, 1, 0, 1, 0, 1, . . .

P=0, 0, 1, 1, 0, 0, . . .

The numerical value series P may be made up of random numbers which are prescribed by an initial value and a generation method thereof.

Furthermore, when selecting from the 2 kinds of conversion table 34, it is possible to determine the numerical value series P for the next set using the data within the set, instead of using fixed numerical value series P. For example, the initial value of the numerical value series P may be set to P(1)=0 for the first set, P(i)=P (i−1)xor{LSB of S4 of (i−1)th set} or, P(i)={not MSB of S1 of (i−1)th set} or P(i)={LSB of S2 of (i−1)th set} for the ith set, where i≧2 and "xor" is an operator indicating a logical exclusive-OR operation and "not" is an operator indicating a logical not operation. Hence, when judging the multi-level data, the judgement may be made not only based on the target set but based also on a plurality of sets before and after the target set, to thereby reduce the error.

Next, a description will be given of the method of judging the multi-level data in the multi-level data judging circuit 29.

First, a description will be given of the test data which is recorded on the optical disk 3 for use by a first multi-level data judging method, separately from the multi-level data. The test data is as follows in a case where 3 symbols of the octal data are consecutive.

Test Data:
000 001 002 003 004 005 006 007
010 011 012 013 014 015 016 017
020 021 022 023 024 025 026 027
. . .
. . .
760 761 762 763 764 765 766 767
770 771 772 773 774 775 776 777

The test data shown above describes all ($8^3$=512) combinations for the case where 3 symbols of the octal data are consecutive. If the intersymbol interference only affects the adjacent multi-level data 1 symbol before and 1 symbol after, the test data describing all ($8^3$=512) combinations for the case where 3 symbols of the octal data are consecutive is recorded on the optical disk 3. If the intersymbol interference affects the multi-level data of 2 symbols before and 2 symbols after, a test data describing all combinations ($8^5$=32768) combinations for the case where 5 symbols of the octal data are consecutive is recorded on the optical disk 3.

The test data may be recorded on the optical disk 3 at a recording position in an inner peripheral portion, an outer peripheral portion and an intermediate portion of the optical disk 3. Alternatively, the test data may be recorded for every 1 revolution of the optical disk 3. The test data may also be inserted between the data which is obtained by converting the binary data into the multi-level data, for every predetermined period. By recording the test data on the optical disk 3, it is possible to suppress a change in the reproduced signal at the recording position on the optical disk 3, and stably reproduce the multi-level data.

Next, a description will be given of the method of judging the multi-level data in the multi-level data judging circuit 29 shown in FIG. 2, when reproducing the data from the optical disk 3 which is recorded with the test data described above and the data obtained by converting the binary data into the multi-level data.

First, a description will be given of the method of judging the multi-level data when the arbitrary binary data is converted into the multi-level data.

When reproducing the multi-level data from the reproduced signal which is reproduced from the optical disk 3 recorded with the multi-level data, the method of judging the multi-level data carries out the following. That is, a reproduced signal of the test data is input, and signal values of the multi-level data are stored. A reproduced signal of the multi-level data which is obtained by converting the binary data is input, and errors between the signal values of the multi-level data and the stored signal values are calculated. The multi-level data having a smallest error as a judging candidate of each symbol within the set is regarded as a first candidate, and the multi-level data having the next smallest error is regarded as a second candidate. A candidate of a multi-level data series of m symbols within the set is generated using the first and second candidates of each symbol, according to the predetermined conversion rule which is used to convert the (m−k)-bit binary data into m bits. An error between the signal value of each symbol and stored signal value corresponding to the candidate multi-level data is calculated, and the multi-level data series having a smallest total error amounting to m symbols of 1 candidate is output as the reproduced multi-level data.

A description will now be given of a case where the binary data is converted into the multi-level data according to the method described above in conjunction with FIG. 3 using the kind (1) of the conversion table 34 shown in FIG. 4. For the sake of convenience, the test data used is that for the case where 3 symbols of the octal data are consecutive.

Figure 1:
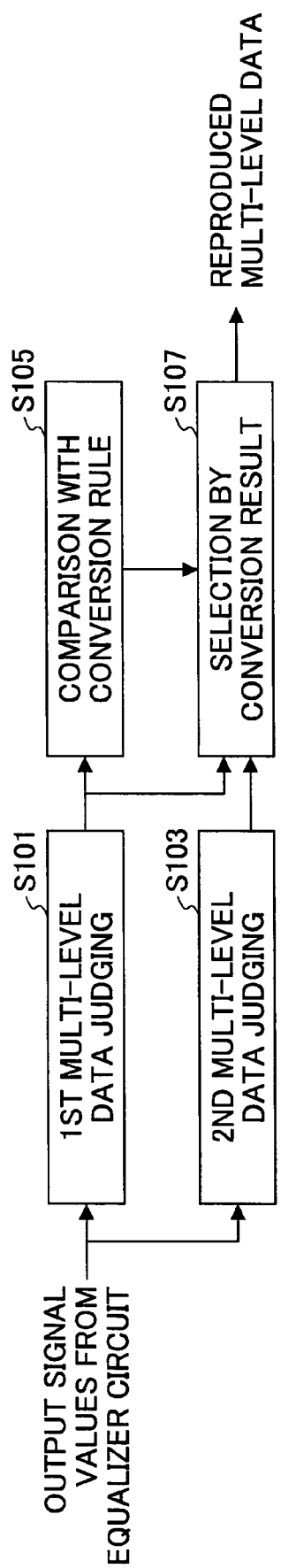
FIG. 1 is a flow chart for explaining an example of a proposed multi-level data processing method which carries out first and second multi-level data judging processes in parallel.
Figure 5:
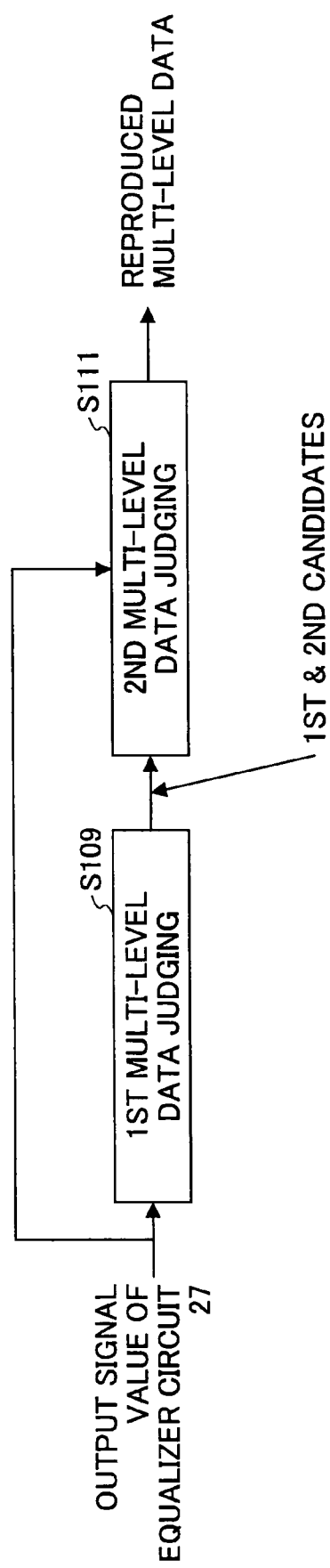
FIG. 5 is a flow chart for explaining a multi-level data judging method employed by a multi-level data judging circuit.

As described before in conjunction with FIG. 1, the previously proposed multi-level data processing method carries out first and second multi-level data judging processes in parallel. But in this embodiment, a second multi-level data judging process is carried out after a first multi-level data judging process is carried out, as shown in FIG. 5. FIG. 5 is a flow chart for explaining the multi-level data judging method employed by the multi-level data judging circuit 29 shown in FIG. 2.

First, the first multi-level data judging process will be described with reference to FIG. 5. In FIG. 5, a step S109 carries out the first multi-level data judging process with respect to the output signal value of the waveform equalizer circuit 27 shown in FIG. 2. More particularly, the test data is reproduced, and a table 134 shown in FIG. 6 is created. FIG. 6 is a diagram showing this table 134 which stores signal values of a center multi-level data of all combinations of multi-level data of 3 consecutive symbols of the test data, that is, the output signal values of the waveform equalizer circuit 27. In FIG. 6, T(p, q, r) indicates the signal value of the center multi-level data of the multi-level data of 3 consecutive symbols having the symbol values p, q and r, where p, q, r=0, . . . , 7. The value obtained by reproducing the test data once may be used as the signal value or, an average value of the values obtained by reproducing the test data a plurality of times may be used as the signal value. The table 134 shown in FIG. 6 may be provided within the multi-level data judging circuit 19, for example.

Next, the multi-level data is judged. More particularly, the signal values of the multi-level data of 3 consecutive symbols, that is, the output signal values of the waveform equalizer circuit 27 shown in FIG. 2, are input, and the symbol value of the center multi-level data is output. In order to do so, a provisional judgement is first made with respect to the multi-level data 1 symbol before and 1 symbol after. A threshold value which is used to make the provisional judgement is calculated from the values stored in the table 134 shown in FIG. 6.

A representative value L(s) of the signal values corresponding to each of the symbol values (s=0, . . . , 7) is calculated according to the following formula (1).

$$L(s) = \sum_{P,r=0}^{7} T(p, s, r)/64 \qquad (1)$$

Then, a threshold value X(u) between adjacent symbol values is calculated according to the following formula (2), where u=0, . . . , 6.

$$X(u) = \{L(u) + L(u+1)\}/2 \qquad (2)$$

The signal values of the multi-level data 1 symbol before and 1 symbol after are compared with the threshold value X(u) calculated from the formula (2), to provisionally judge the multi-level data 1 symbol before and 1 symbol after. More particularly, if the signal values of the multi-level data 1 symbol before and 1 symbol after are denoted by Y, v satisfying the following relationship (3) is regarded as the symbol value obtained by the provisional judgement.

i) $v=7$ if $Y \geq X(6)$ ii) $X(v) > Y \geq X(v-1)$ iii) $v=0$ if $X(0) > Y$ \qquad (3)

The symbol values of the multi-level data 1 symbol before and 1 symbol after which are obtained by the provisional judgement are respectively denoted by p and r, and an error with respect to the signal value T(p, q, r) of the center multi-level data is calculated for q=0, . . . , 7. Of the 8 errors calculated, the symbol value q corresponding to the smallest error is output as a first candidate (q1), and the symbol value q corresponding to the next smallest (second smallest) error is output as a second candidate (q2). In this manner, the first and second candidates (q1 and q2) are output with respect to each symbol within 1 set. In other words, only a first candidate is output according to the first multi-level data judging process of the previously proposed multi-level data processing method described before in conjunction with FIG. 1, but the first and second candidates (q1 and q2) are output according to the first multi-level data judging process of this embodiment.

Next, the second multi-level data judging process will be described with reference to FIGS. 5, 7A and 7B. In FIG. 5, a step S111 inputs the first and second candidates of each symbol output by the step S109, and outputs the reproduced multi-level data by making a final judgement.

FIG. 7A is a diagram showing the first and second candidates (q1 and q2) of each symbol within 1 set, and FIG. 7B is a diagram showing judging candidates amounting to 4 symbols within 1 set that are generated using the first and second candidates (q1 and q2) of each symbol based on the kind (1) of the conversion table 34 shown in FIG. 4. To facilitate the understanding, FIG. 7B also shows the contents of the kind (1) of the conversion table 34 shown in FIG. 4. L1 to L4 in the kind (1) of the conversion table 34 indicate only the LSB of the multi-level data, and indicate whether the multi-level data is an even number of an odd number. Accordingly, "0" in the conversion table 34 indicates an even number, and "1" indicates an odd number. Of the first and second candidates (q1 and q2) of each symbol, one is an even number and the other is an odd number. 4 kinds of judging candidates, each amounting to 4 symbols within 1 set, are generated by selecting the odd or even number candidate according to the conversion table 34.

Next, the final judgement result is output based on the 4 kinds of judging candidates. The error between the signal value of each symbol (output signal value of the waveform equalizer circuit 27) and the signal value corresponding to the symbol value of each judging candidate is obtained for 4 symbols and added, and the judging candidate which makes the total error for the 4 symbols the smallest is output as the final judgement result. The signal value stored in the table 134 is used as the signal value corresponding to the symbol value of each judging candidate. For example, if S1=2, S2=4, and the symbol value of the multi-level data 1 symbol before the symbol S1 is 5 for a judging candidate, the signal value T(5, 2, 4) is used as the signal value corresponding to the symbol S1. Alternatively, the signal values 1 symbol before and 1 symbol after may be provisionally judged, to use the signal values stored in the table 134.

Therefore, the second multi-level data judging process generates the judging candidate within 1 set according to the conversion table 34, by using the first and second candidates (q1 and q2) of each symbol determined by the first multi-level data judging process. For this reason, the reliability of the judgement result is improved. Furthermore, since the redundant bit is increased to 2 bits, the number of judging candidates is reduced to 1/4 compared to the previously proposed multi-level data judging method described before in conjunction with FIG. 1, to thereby reduce erroneous judging of the multi-level data.

In the embodiment described above, the final judgement result is output using the data within 1 set. However, in a case where the predetermined conversion rule also uses the data within the previous set, the multi-level data is judged using the data within a plurality of sets, as will be described hereunder.

First, in each set, the candidate which makes the error the smallest is selected for the case where the numerical value series P is "0" and for the case where the numerical value series P is "1". Then, the candidate is selected in the following set which is related by the numerical value series P, for a case where the numerical value series P is "0" and for a case where the numerical value series P is "1" in a first set of the plurality of sets, so as to create the candidates amounting to the plurality of sets for 2 systems. Of the 2 systems of candidates, the candidate which makes the error smaller is output as the final judgement result. Thus, when judging the multi-level data, the judgement can be made not only based on the target set but also based on the plurality of sets including the target set, and the error can be reduced.

When outputting the candidates in the plurality of sets, instead of using only the candidate which makes the error the smallest in each set, it is also possible to use other candidates. For example, the candidate which makes the error the second smallest or, all of the candidates, for example, may be used in each set. In this case, the candidate which makes the error the smallest of all combinations of the candidates in the plurality of sets may be output as the final judgement result. By taking such a measure, in a case where the combination of candidates which make the error the smallest in each of the sets does not make the error the smallest in a combination of a plurality of sets, it becomes possible to further improve the accuracy of judging the multi-level data.

The multi-level data processing method described above may be realized by a software (computer program) which operates in a computer system having a microprocessor (or CPU), a digital signal processor or the like. Alternatively, the multi-level data processing method described above may be realized by an exclusive hardware. A description will now be given of a case where the multi-level data processing method is realized by the exclusive hardware.

A description will first be given of an embodiment of the multi-level data conversion circuit 15. FIG. 8 is a system block diagram showing a structure of the multi-level data conversion circuit 15 for converting the binary data into the multi-level data. FIG. 8 shows the multi-level data conversion circuit 15 which converts the 10-bit binary data into the 4-symbol octal data (3 bits).

The multi-level data conversion circuit 15 shown in FIG. 8 includes 3 selectors 35, 37 and 39, and a converting circuit 41. Each of the selectors 35, 37 and 39 inputs a 4-bit data, and outputs 1 bit of the 4-bit data. The converting circuit 41 converts a 2-bit data into a 4-bit data. Hence, 10 bits are input in parallel to the multi-level data conversion circuit 15, and the multi-level data conversion circuit 15 outputs a parallel data indicating 1 symbol in 3 bits. The multi-level data conversion circuit 15 further includes a control circuit for generating control signals which control the switching of the selectors 35, 37 and 39 in synchronism with the timings of the input and output data, but the illustration thereof will be omitted for the sake of convenience. The functions of this control circuit may be realized by the microprocessor (or CPU) which controls the operation of the entire optical disk drive 1 shown in FIG. 2.

A description will now be given of the operation of converting the binary data into the multi-level data by the multi-level data conversion circuit 15. The converting circuit 41 can realize the conversion table 34 by using known semiconductor memories and logic circuits. The selectors 35, 37 and 39 are controlled by the control circuit to successively output (D3, D4, L1), (D5, D6, L2), (D7, D8, L3) and (D9, D10, L4). Hence, the binary data can be converted into the multi-level data by the multi-level data conversion circuit 15 having a simple hardware structure.

If the multi-level data which has already been output is input to the converting circuit 41, it is possible to carry out a data conversion which relates the data within the other sets.

In addition, a switching circuit (not shown) may be switched to selectively output the test data and the multi-level data which is output from the circuit shown in FIG. 8 which converts the binary data into the multi-level data. In this case, it is possible to mix the test data and the multi-level data forming the user data.

Figure 9:
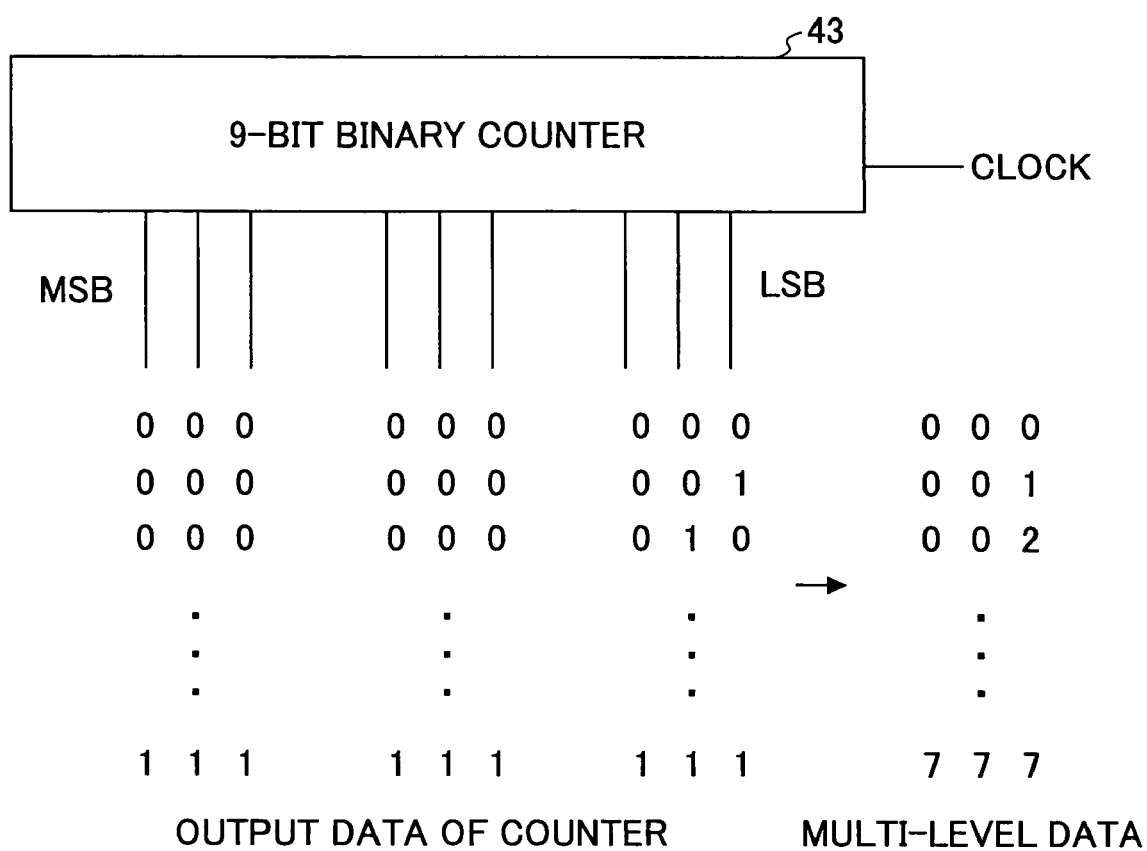
FIG. 9 is a diagram showing a structure of a test data generating circuit.

FIG. 9 is a diagram showing a structure of a test data generating circuit. The test data generating circuit shown in FIG. 9 includes a 9-bit binary counter 43. As shown in FIG. 9, an output of the 9-bit binary counter 43 is grouped into 3 3-bit portions, and each 3-bit portion is output as the multi-level data (octal data) so as to generate the test data shown on the right side of the 3 3-bit portions in FIG. 9.

Figure 10:
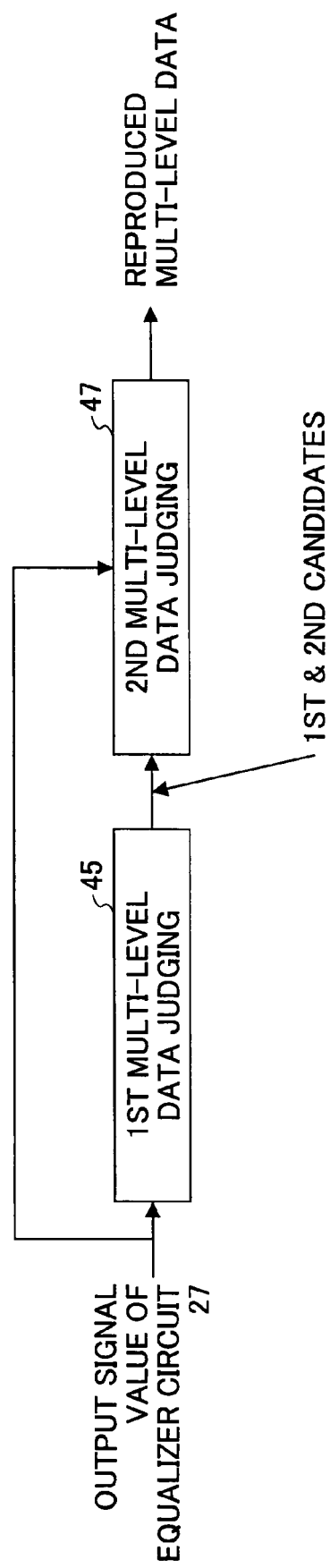
FIG. 10 is a functional block diagram showing a structure of the multi-level data judging circuit.

Next, a description will be given of the multi-level data judging circuit 29. FIG. 10 is a functional block diagram showing a structure of the multi-level data judging circuit 29 shown in FIG. 2. As shown in FIG. 10, the multi-level data judging circuit 29 includes a first multi-level data judging circuit 45 which realizes the first multi-level data judging method, and a second multi-level data judging circuit 47 which realizes the second multi-level data judging method. The first multi-level data judging circuit 45 outputs the first and second candidates (q1 and q2) of the judging candidate of each symbol, based on the output signal value of the waveform equalizer circuit 27. The second multi-level data judging circuit 47 carries out the final judgement based on the output signal value of the waveform equalizer circuit 27 and the first and second candidates (q1 and q2) output from the first multi-level data judging circuit 45, and outputs the reproduced multi-level data.

A description will be given of each of the first and second multi-level data judging circuits 45 and 47, by referring to FIGS. 11 and 12.

Figure 11:
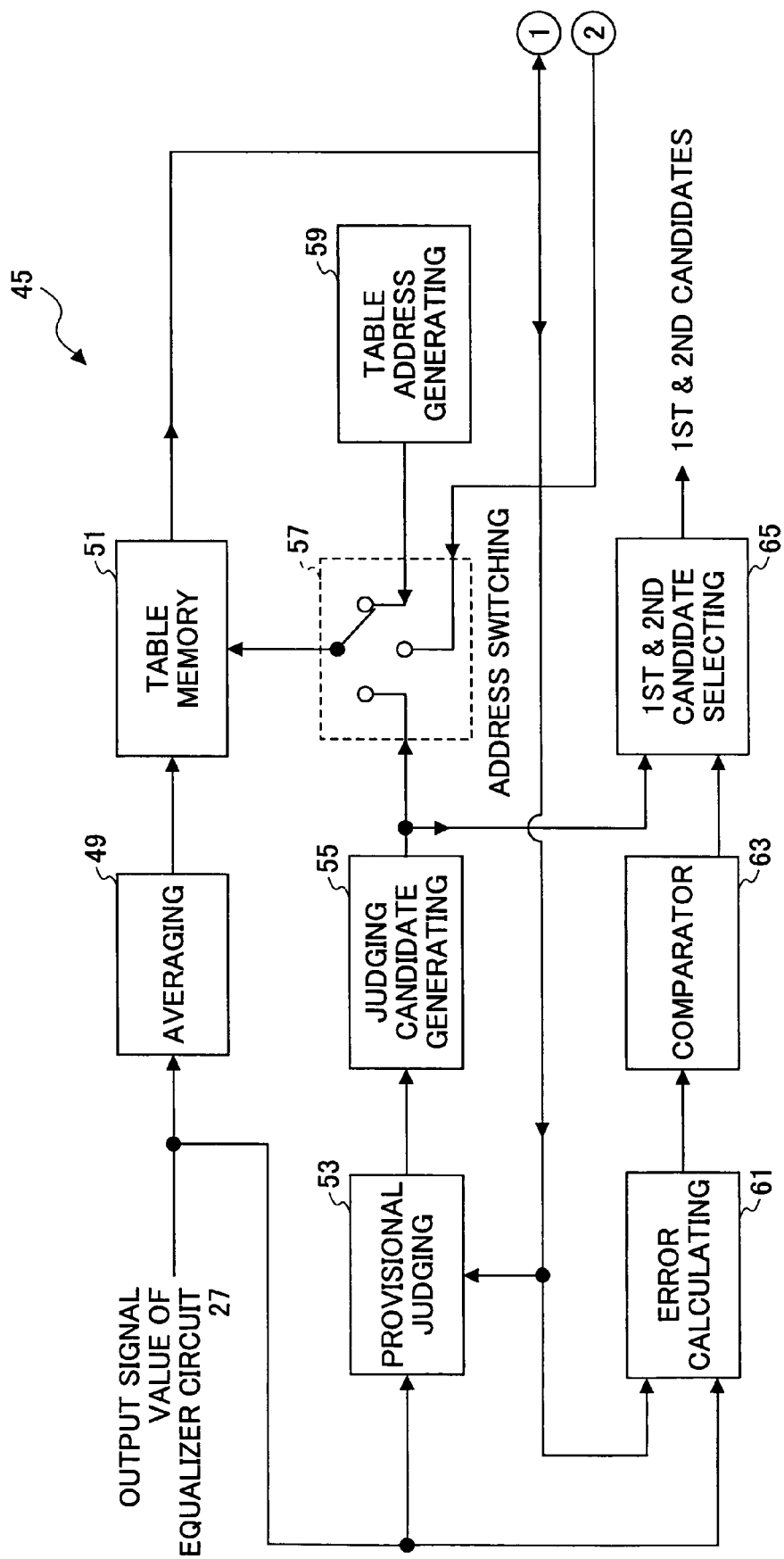
FIG. 11 is a system block diagram showing a structure of a first multi-level data judging circuit.

FIG. 11 is a system block diagram showing a structure of the first multi-level data judging circuit 47. The first multi-level data judging circuit 45 includes an averaging circuit 49, a table memory circuit 51, a provisional judging circuit 53, a judging candidate generating circuit 55, an address switching circuit 57, a table address generating circuit 59, an error calculating circuit 61, a comparator circuit 63, and a first and second candidate selecting circuit 65.

The averaging circuit 49 obtains an average value of the signal values output from the waveform equalizer circuit 27. The table memory circuit 51 forms the table 134 shown in FIG. 6. The table memory circuit 51 includes a data input terminal which receives the signal value when creating the table 134, a data output terminal which outputs the signal value when calculating the error, and an address input terminal which is used to input the value of a plurality of multi-level data. For example, when using 3 octal data to create a continuous table 134, a 9-bit address data is used in groups of 3-bit portions. The table memory circuit 51 also outputs the signal value to the second multi-level data judging circuit 47 shown in FIG. 12 which will be described later.

The provisional judging circuit 53 determines the threshold value X(u) by calculating the formulas (1) and (2) described above using adders and the like, and further calculates the relationship (3) described above using comparators and the like, so as to provisionally judge the first and third multi-level data respectively before and after (on both sides of) the second (center) multi-level data of the 3 consecutive multi-level data. The judging candidate generating circuit 55 outputs the symbol values of the first and third multi-level data of the 3 consecutive multi-level data output from the provisional judging circuit 53, and the symbol value (0 to 7) of the candidate of the center multi-level data.

The address switching circuit 57 switches the address data input to the address input terminal of the table memory circuit 51. When creating the table 134 and when calculating the threshold value X(u) for use in making the provisional judging, the address switching circuit 57 inputs the output of the table address generating circuit 59 to the address input terminal of the table memory circuit 51. On the other hand, when judging the multi-level data, the address switching circuit 57 inputs the output of the judging candidate generating circuit 55 to the address input terminal of the table memory circuit 51. The address switching circuit 57 also has a switching function to output from the table 134 the signal value of the judging candidate to be used by a judging candidate output circuit 67 of the second multi-level data judging circuit 47 shown in FIG. 12 which will be described later.

When creating the table 134, the test data is reproduced from the optical disk 3, and the signal value of the center multi-level data of all combinations of the multi-level data of 3 consecutive symbols is input to the table memory circuit 51. The symbol value of the multi-level data in this case is known as the test data, and can be generated by the test data generating circuit shown in FIG. 9. Hence, the table address generating circuit 59 is provided to input the test data which is output from the test data generating circuit shown in FIG. 9 as the multi-level data to the address input terminal of the table memory circuit 51. The table address generating circuit 59 also generates an address which is used when calculating the threshold value X(u) used for making the provisional judgement.

The error calculating circuit 61 calculates an error between the signal values of the 8 candidates in the table 134 and the signal value of the center multi-level data which is input to the error calculating circuit 61. The comparator circuit 63 compares the errors output from the error calculating circuit 61 and rearranges the errors in an order of size starting from the smallest error. The first and second candidate selecting circuit 65 outputs the candidate (first candidate) which makes the error the smallest, and the candidate (second candidate) which makes the error the second smallest.

The first multi-level data judging circuit 45 may further include a control circuit which controls the first multi-level data judging circuit 45 and the operation of the entire optical disk drive 1 shown in FIG. 2, but the illustration thereof will be omitted for the sake of convenience. The functions of this control circuit may be realized by the microprocessor (or CPU) which controls the operation of the entire optical disk drive 1.

Next, a description will be given of the operation of the first multi-level data judging circuit 45 shown in FIG. 11. First, the test data recorded on the optical disk 3 is reproduced, and the signal value of the center multi-level data of the multi-level data of 3 consecutive symbols is input to the table memory circuit 51 by the operations of the table address generating circuit 59 and the averaging circuit 49, so as to create the table 134. Then, the signal value in the table 134 is input to the provisional judging circuit 53, so as to calculate the threshold value X(u) for use in making the provisional judgement.

Thereafter, the multi-level data which is obtained by converting the binary data and recorded on the optical disk 3 is reproduced from the optical disk 3. Of the reproduced multi-level data of 3 consecutive symbols, the signal values of the first and third multi-level data 1 symbol before and 1 symbol after the center multi-level data are obtained and input to the provisional judging circuit 53. Based on the provisional judgement result, the judging candidate generating circuit 55 outputs 8 kinds of judging candidates. The error calculating circuit 61 calculates the error between the signal value of the center multi-level data of the multi-level data of 3 consecutive data and the signal values in the table 134 corresponding to the 8 kinds of judging candidates. The comparator circuit 63 rearranges the order of the errors calculated by the error calculating circuit 61 in the order of size starting from the smallest error. The first and second candidate selecting circuit 65 outputs the judging candidate corresponding to the smallest error as the first candidate, and outputs the judging candidate corresponding to the second smallest error as the second candidate.

Figure 12:
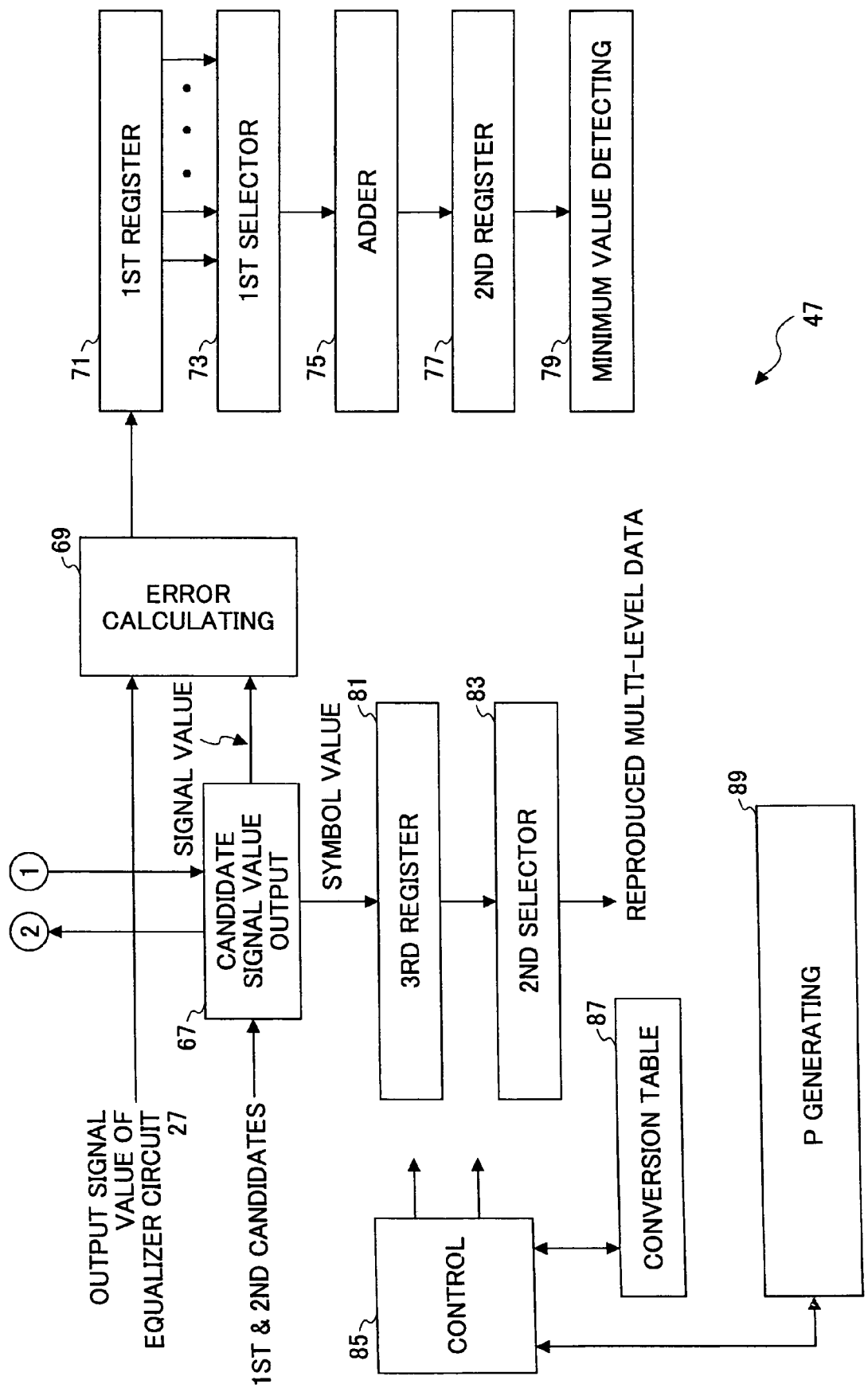
FIG. 12 is a system block diagram showing a structure of a second multi-level data judging circuit.

FIG. 12 is a system block diagram showing a structure of the second multi-level data judging circuit 47. The second multi-level data judging circuit 47 includes the candidate signal value output circuit 67, an error calculating circuit 69, a first register circuit 71, a first selector circuit 73, an adder circuit 75, a second register circuit 77, a minimum value detecting circuit 79, a third register circuit 81, a second selector circuit 83, a control circuit 85, a conversion table 87, and a P generating circuit 89 which generates a numerical value series (P) for conversion table selection.

The candidate signal value output circuit 67 outputs signal values corresponding to the symbol values of the first and second candidates of each symbol received from the first and second candidate selecting circuit 65 within the first multi-level data judging circuit 45 shown in FIG. 11. The values stored in the table memory circuit 51 within the first multi-level data judging circuit 45 are used for the signal values corresponding to the symbol values of the first and second candidates. Accordingly, the symbol values of the first and second candidates received from the first and second candidate selecting circuit 65 are output from the candidate signal value output circuit 67 and input to the address input terminal of the table memory circuit 51 via the address switching circuit 57. The signal values stored in the table 134 of the table memory circuit 51 are input to the candidate signal value output circuit 67 of the second multi-level data judging circuit 47, and then input to the error calculating circuit 69. In addition, the symbol values of the first and second candidates for each symbol are output from the candidate signal value output circuit 67 to the third register circuit 81.

The error calculating circuit 69 calculates an error between the input signal value and the signal value of the judging candidate. The first register circuit 71 holds errors output from the error calculating circuit 69 and amounting to 1 set or, corresponding to a number of symbols amounting to a plurality of sets. The first selector circuit 73 selects an output of the first register circuit 71 in correspondence with a bit pattern of the conversion table 87, and outputs the selected output in order to calculate a total of the errors within 1 set or within the plurality of sets.

The adder circuit 75 adds the errors output from the first selector circuit 73, and outputs a total value. The second register circuit 77 holds an output of the adder circuit 75. The minimum value detecting circuit 79 detects a minimum value from outputs of the second register circuit 77.

The third register circuit 81 holds a symbol value series of the judging candidate amounting to 1 set or the plurality of sets received from the candidate signal value output circuit 67. The second selector circuit 83 selects a symbol value of the judging candidate held in the third register circuit 81 corresponding to the minimum value detected by the minimum value detecting circuit 79, in correspondence with the bit pattern of the conversion table 87, and outputs the selected symbol value as the judgement result.

The control circuit 85 controls the operation of the entire second multi-level data judging circuit 47. The conversion table 87 is the same as the conversion table 34 described above for converting the binary data into the multi-level data. The P generating circuit 89 generates the numerical value series P which is used to select the conversion table 87 when switching the conversion table 87 for each set. The P generating circuit 89 may be omitted if only one kind of conversion table 87 is used. In a case where the numerical value series P is uniquely determined, measures are taken so that the numerical value series P is the same as that used when converting the binary data into the multi-level data. In addition, in a case where the numerical value series P is determined by a logic operation carried out with respect to the data within the set, the numerical value series P may be generated in the P generating circuit 89 by inputting the symbol value of the judging candidate.

Next, a description will be given of the second multi-level data judging circuit 47 shown in FIG. 12. First, the signal values corresponding to the first and second candidates of each symbol received from the first and second candidate selecting circuit 65 of the first multi-level data judging circuit 45 shown in FIG. 11 are output from the candidate signal value output circuit 67 shown in FIG. 12. The error calculating circuit 69 calculates the error of the signal values of the first and second candidates of each symbol with respect to the input signal value which is received from the waveform equalizer circuit 27 shown in FIG. 2. The symbol values of the first and second candidates of each symbol are held in the third register circuit 81.

The first register circuit 71 holds the errors of the number of symbols corresponding to 1 set or the plurality of sets. Thereafter, the first selector circuit 73 selects and outputs to the adder circuit 75 the error of the signal values of all judging candidates based on the conversion table 87. Hence, the total of the errors for each judging candidate is calculated and held in the second register circuit 77. Then, the minimum value detecting circuit 79 detects the minimum value of the totals of the errors output from the second register circuit 79. Of the symbol values of the judging candidates held in the third register circuit 81, each symbol value corresponding to the judging candidate which makes the error the minimum value is selected by the second selector circuit 83, and output as the reproduced multi-level data.

The second multi-level data judging circuit 47 shown in FIG. 12 can hold the errors for all combinations, amounting to the plurality of sets, of the judging candidates in each of the plurality of sets. For this reason, it is possible to select the candidate which makes the error the minimum not only from the combination of the candidates which make the error the minimum in each set, but also from all combination of the candidates.

The multi-level data judging circuit 29 shown in FIG. 2 may be formed by the first multi-level data judging circuit 45 and the second multi-level data judging circuit 47 described above. Furthermore, by providing the multi-level data conversion circuit 15 and the multi-level data judging circuit 29 in the optical disk drive 1 shown in FIG. 2, it becomes possible to record information on and reproduce information from the optical disk 3.

In this embodiment, the analog-to-digital conversion of the ADC circuit 23 which quantizes the amplitude of the reproduced signal is employed as a means of quantizing the multi-level data signal. However, the means of quantizing the multi-level data signal is not limited to such, as will be described hereunder.

Figure 13:
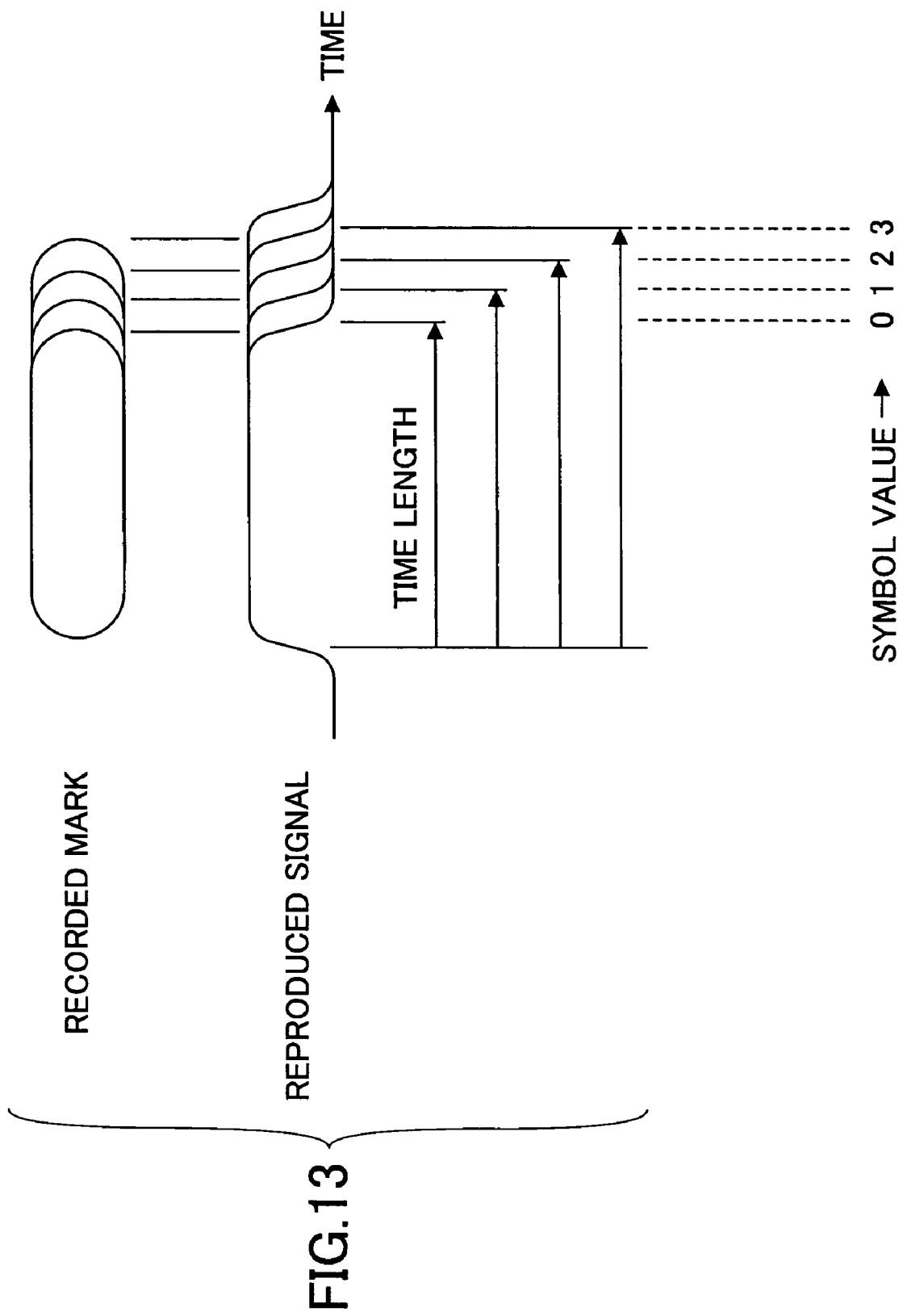
FIG. 13 is a diagram for explaining a multi-level recording by varying lengths of marks recorded on an information recording medium.

FIG. 13 is a diagram for explaining a multi-level recording by varying lengths of the marks recorded on the information recording medium. For example, the information recording medium is the optical disk 3 shown in FIG. 2. In this case, the reproduced signal is a binary data, but a change in the time lengths (durations) of pulses corresponding to the marks becomes a multi-level data (multi-level data signal). By counting the time length by a counter circuit (not shown) which operates in response to a reference clock, it is possible to obtain a signal value (digital data) obtained by quantizing the multi-level data signal. Thereafter, a constant value may be subtracted from each signal value, so as to adapt the embodiment described above which employs the analog-to-digital conversion to the case shown in FIG. 13.

Further, the present invention is not limited to these embodiments, but various variations and modifications may be made without departing from the scope of the present invention.

What is claimed is:

1. A multi-level data processing method for converting a binary data into a multi-level data having n bits per symbol, where n is an integer satisfying n÷2, comprising:
   arranging a $\{(n-1) \times m\}$-bit binary data in upper $(n-1)$ bits of multi-level data of m symbols, where m is an integer satisfying $m \geq 2$; and
   converting a $(m-k)$-bit binary data into m bits according to a predetermined conversion rule and arranging the m bits in a lower 1 bit of the multi-level data of m symbols, where k is an integer satisfying $m > k \geq 1$, so as to convert a $(n \times m - k)$-bit binary data into 1 set of multi-level data made up of m symbols.

2. The multi-level data processing method as claimed in claim 1, wherein k=2.

3. The multi-level data processing method as claimed in claim 1, further comprising:
   relating data within other sets to the m bits when converting the $(m-k)$-bit binary data into the m bits.

4. The multi-level data processing method as claimed in claim 1, further comprising:
   mixing to the multi-level data made up of the m symbols a test data which includes $2^{(M \times n)}$ combinations of M consecutive multi-level data, where M is an integer satisfying $M \geq 3$.

5. The multi-level data processing method as claimed in claim 4, which reproduces multi-level data from a reproduced signal which is reproduced from an information recording medium which is recorded with a mixture of the multi-level data amounting to the m bits and the test data, comprising:
   inputting the reproduced signal of the test data and storing signal values of the multi-level data;
   inputting the reproduced signal of the multi-level data which has been converted from the binary data;
   calculating errors between the signal values of the multi-level data and the stored signal values;
   outputting a multi-level data having a smallest error as a judging candidate of each symbol within one set as a first candidate, and outputting a multi-level data having a second smallest error as a second candidate;
   generating a candidate of a multi-level data series of m symbols within one set according to the predetermined conversion rule, using the first and second candidates for each symbol;
   calculating errors between the signal value of each symbol and stored signal values corresponding to the candidate multi-level data; and
   outputting as a reproduced multi-level data a multi-level data series having a smallest total of the errors amounting to m symbols of one candidate.

6. A multi-level data processing apparatus for converting a binary data into a multi-level data having n bits per symbol, where n is an integer satisfying $n \geq 2$, comprising:
   means for arranging a $\{(n-1) \times m\}$-bit binary data in upper $(n-1)$ bits of multi-level data of m symbols, where m is an integer satisfying $m \geq 2$; and
   means for converting a $(m-k)$-bit binary data into m bits according to a predetermined conversion rule and arranging the m bits in a lower 1 bit of the multi-level data of m symbols, where k is an integer satisfying $m > k \geqq 1$, so as to convert a $(n \times m - k)$-bit binary data into 1 set of multi-level data made up of m symbols.

7. The multi-level data processing apparatus as claimed in claim 6, wherein k=2.

8. The multi-level data processing apparatus as claimed in claim 6, further comprising:
   means for relating data within other sets to the m bits when converting the (m−k)-bit binary data into the m bits.

9. The multi-level data processing apparatus as claimed in claim 6, further comprising:
   means for mixing to the multi-level data made up of the m symbols a test data which includes $2^{(M \times n)}$ combinations of M consecutive multi-level data, where M is an integer satisfying $M \geqq 3$.

10. The multi-level data processing apparatus as claimed in claim 9, which reproduces multi-level data from a reproduced signal which is reproduced from an information recording medium which is recorded with a mixture of the multi-level data amounting to the m bits and the test data, comprising:
   means for inputting the reproduced signal of the test data and storing signal values of the multi-level data;
   means for inputting the reproduced signal of the multi-level data which has been converted from the binary data;
   means for calculating errors between the signal values of the multi-level data and the stored signal values;
   means for outputting a multi-level data having a smallest error as a judging candidate of each symbol within one set as a first candidate, and outputting a multi-level data having a second smallest error as a second candidate;
   means for generating a candidate of a multi-level data series of m symbols within one set according to the predetermined conversion rule, using the first and second candidates for each symbol;
   means for calculating errors between the signal value of each symbol and stored signal values corresponding to the candidate multi-level data; and
   means for outputting as a reproduced multi-level data a multi-level data series having a smallest total of the errors amounting to m symbols of one candidate.

11. A multi-level data processing apparatus for converting a binary data into a multi-level data having n bits per symbol, where n is an integer satisfying $n \geqq 2$, comprising:
   a section to arrange a $\{(n-1) \times m\}$-bit binary data in upper (n−1) bits of multi-level data of m symbols, where m is an integer satisfying $m \geqq 2$; and
   a section to convert a (m−k)-bit binary data into m bits according to a predetermined conversion rule and arranging the m bits in a lower 1 bit of the multi-level data of m symbols, where k is an integer satisfying $m > k \geqq 1$, so as to convert a $(n \times m - k)$-bit binary data into 1 set of multi-level data made up of m symbols.

12. A multi-level data processing apparatus for converting a binary data into a multi-level data having n bits per symbol to be recorded on an information recording medium, where n is an integer satisfying $n \geqq 2$, comprising:
   a section to arrange a $\{(n-1) \times m\}$-bit binary data in upper (n−1) bits of multi-level data of m symbols, where m is an integer satisfying $m \geqq 2$;
   a section to convert a (m−k)-bit binary data into m bits according to a predetermined conversion rule and arranging the m bits in a lower 1 bit of the multi-level data of m symbols, where k is an integer satisfying $m > k \geqq 1$, so as to convert a $(n \times m - k)$-bit binary data into 1 set of multi-level data made up of m symbols; and
   a section to mix to the multi-level data made up of the m symbols a test data which includes $2^{(M \times n)}$ combinations of M consecutive multi-level data, where M is an integer satisfying $M \geqq 3$, to be recorded on the information recording medium.

13. The multi-level data processing apparatus as claimed in claim 12, which reproduces multi-level data from a reproduced signal which is reproduced from the information recording medium which is recorded with the mixture of the multi-level data amounting to the m bits and the test data, comprising:
   a section to input the reproduced signal of the test data and store signal values of the multi-level data;
   a section to input the reproduced signal of the multi-level data which has been converted from the binary data;
   a section to calculate errors between the signal values of the multi-level data and the stored signal values;
   a section to output a multi-level data having a smallest error as a judging candidate of each symbol within one set as a first candidate, and to output a multi-level data having a second smallest error as a second candidate;
   a section to generate a candidate of a multi-level data series of m symbols within one set according to the predetermined conversion rule, using the first and second candidates for each symbol;
   a section to calculate errors between the signal value of each symbol and stored signal values corresponding to the candidate multi-level data; and
   a section to output as a reproduced multi-level data a multi-level data series having a smallest total of the errors amounting to m symbols of one candidate.

* * * * *